Jan. 25, 1949. H. E. RENAUD 2,460,242
METHOD OF MAKING MODEL DUPLICATES
Filed Dec. 6, 1946 5 Sheets-Sheet 1

INVENTOR
Harold E. Renaud
BY
Richard G. Parsons
ATTORNEY

Jan. 25, 1949. H. E. RENAUD 2,460,242
METHOD OF MAKING MODEL DUPLICATES
Filed Dec. 6, 1946 5 Sheets-Sheet 2

INVENTOR
Harold E. Renaud
BY
Richard G. Parsons
ATTORNEY

Jan. 25, 1949. H. E. RENAUD 2,460,242
METHOD OF MAKING MODEL DUPLICATES
Filed Dec. 6, 1946 5 Sheets-Sheet 3

INVENTOR
Harold E. Renaud
BY
Richard A. Parsons
ATTORNEY

Jan. 25, 1949.  H. E. RENAUD  2,460,242
METHOD OF MAKING MODEL DUPLICATES
Filed Dec. 6, 1946  5 Sheets-Sheet 4

*INVENTOR*
Harold E. Renaud
BY
*Richard A. Parsons*
ATTORNEY

Jan. 25, 1949. H. E. RENAUD 2,460,242
METHOD OF MAKING MODEL DUPLICATES
Filed Dec. 6, 1946 5 Sheets-Sheet 5

INVENTOR
Harold E. Renaud
BY
Richard A. Parsons
ATTORNEY

Patented Jan. 25, 1949

2,460,242

UNITED STATES PATENT OFFICE 2,460,242

METHOD OF MAKING MODEL DUPLICATES

Harold E. Renaud, Lansing, Mich., assignor to Renaud Plastics, Inc., Lansing, Mich., a corporation of Michigan Application December 6, 1946, Serial No. 714,591

5 Claims. (Cl. 18—58)

This invention relates to method of making model duplicates.

In large scale production manufacturing, particularly in the manufacture of sheet metal structures, it is customary to provide a substantial number of models for checking dimensions of the finished parts, as well as the tools from which the parts are made. Heretofore it has been the practice to make each model by hand from carefully dried mahogany or other hard wood. As will be evident, such models are extremely costly.

Accordingly, the principal object of the present invention is to provide a simple and economical method of making a large number of model duplicates or reproductions, all of which are replicas of each other.

Another object of the invention is to provide a model of the character mentioned which can be very economically constructed.

A still further object of the invention is to provide a method of making a number of model duplicates, all of which are very exact reproductions of an original model.

These objects are attained by providing a single original wood model, forming a mold from the model, and casting into the mold a plastic replica of the original model. In order to reduce shrinkage of the plastic casting, the model duplicate is provided with a wooden core which is slightly smaller in all dimensions than the model duplicate.

The foregoing objects will more fully appear in the following specification when read in connection with the accompanying drawings, wherein.

Figure 1:
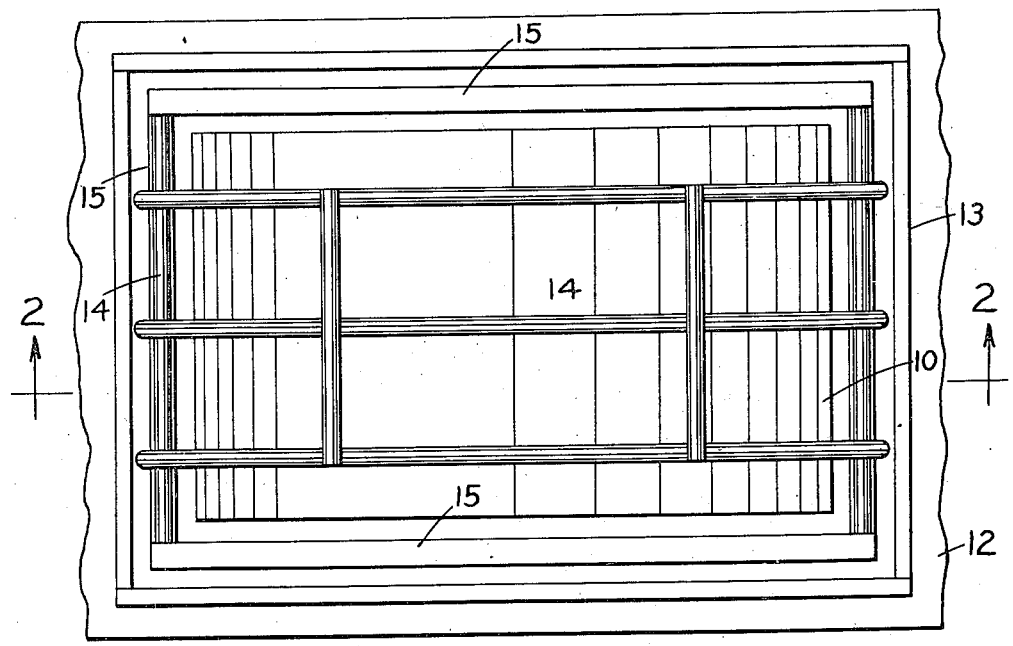
Figure 1 is a plan view of a form employed in making a mold from an original wood model, showing the model in place in the form.
Figure 2:
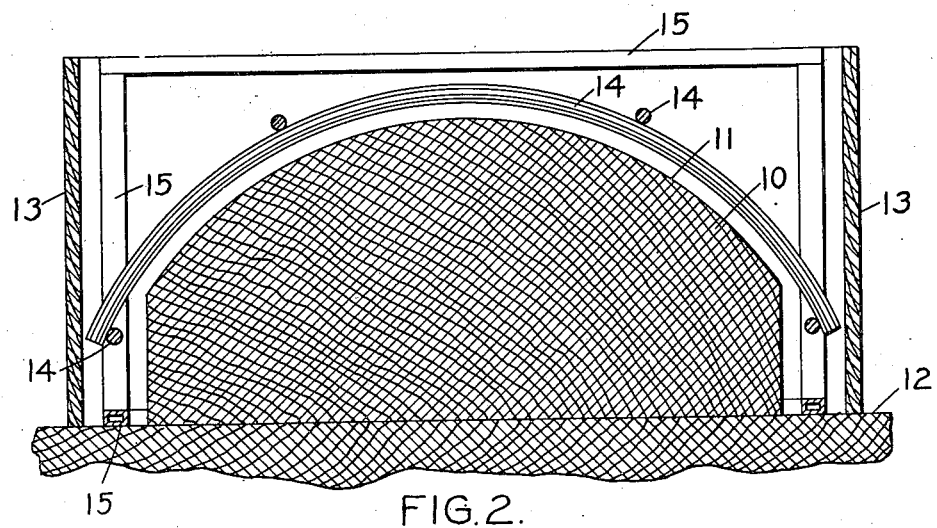
Figure 2 is a cross-sectional view taken on substantially the line 2—2 of Figure 1.
Figure 3:
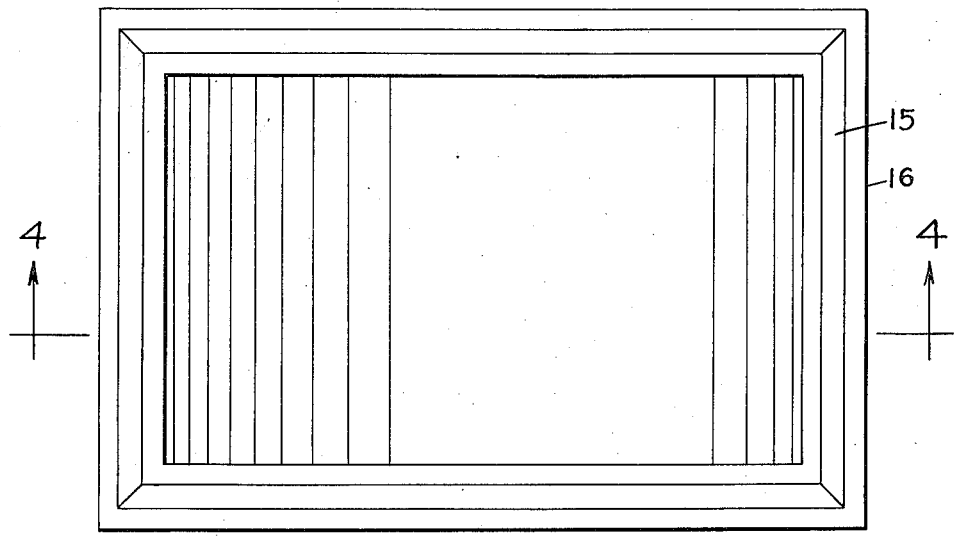
Figure 3 is a plan view of the completed mold.
Figure 4:
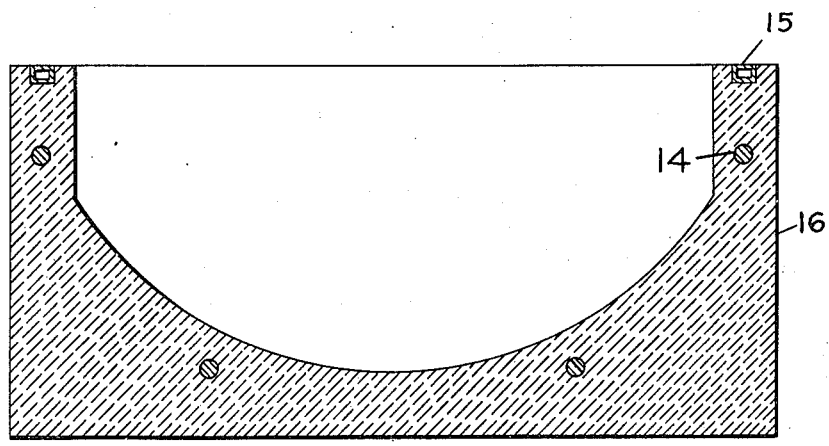
Figure 4 is a cross-sectional view taken on substantially the line 4—4 of Figure 3.
Figure 5:
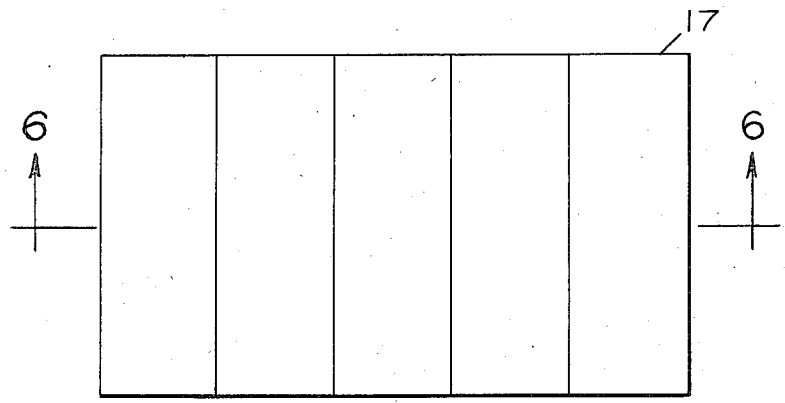
Figure 5 is a plan view of a wooden core used in the completed model duplicate.
Figure 6:
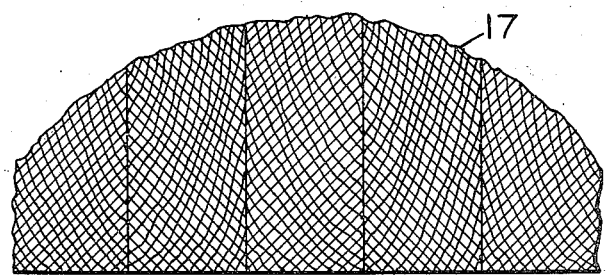
Figure 6 is a cross-sectional view taken on substantially the line 6—6 of Figure 5.

In practicing the method of the present invention a solid wooden model having at least one surface which conforms to the finished sheet metal part is constructed from mahogany or similar hard, relatively shrink free wood. The original model is shown in Figures 1 and 2 and is designated by the numeral 10. The upper surface of the model 10 is designated by the numeral 11 and is shaped to conform to a curved surface of the finished sheet metal part.

The model 10 is coated with a thin coat of stearic acid, which is used as a parting agent. The model is then laid upon any suitable flat surface, such as a flat base 12 for a form shown in Figures 1 and 2. Side walls 13 forming a rectangular box are placed upon and attached to the base 12 around the model 10 in spaced relation to the model. A reinforcing frame work, which may be composed of any suitable type of steel bars 14, is constructed and placed within the form and around the model. The present frame work also includes a plurality of straight tubes 15 of generally rectangular cross-section. The tubes 15 are so arranged that some of them rest flat upon the base 12 and form a rectangle surrounding the model. Still other tubes form a rectangle which is flush with the tops of the side walls 13 of the form. These tubes 15 form an additional support for the mold and reinforce the edges of the mold opening.

Fluid plaster, which may be plaster of Paris or similar material, preferably having a binder of hemp, is then poured into the form and carefully packed against the model so as to completely fill the form. The plaster is allowed to set. After the plaster has set the form is removed from the mold and the mold is carefully dried.

When the mold, which is indicated by the numeral 16, has completely dried, it is painted with a mild acid solution in order to neutralize the same. Normally the plaster from which the mold is made is alkaline, and unless it is neutralized the castings which are made from the mold will have a rough surface.

After the mold 16 is neutralized the surfaces of the interior of the mold are sprayed with lacquer to seal up the pores in the mold. A wax parting compound is applied to the interior surfaces of the mold and carefully polished.

Figure 7:
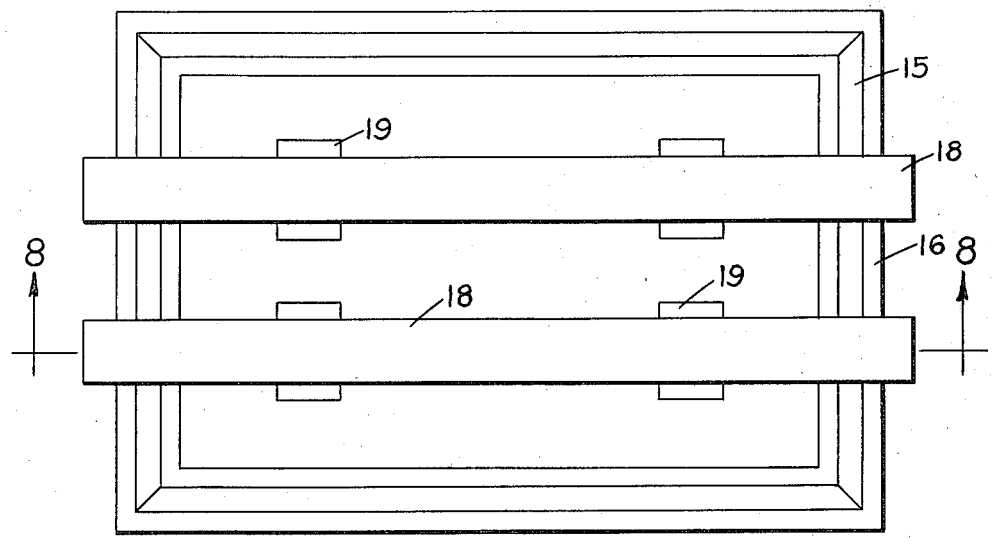
Figure 7 is a plan view of the mold showing the partially finished plastic casting therein.
Figure 8:
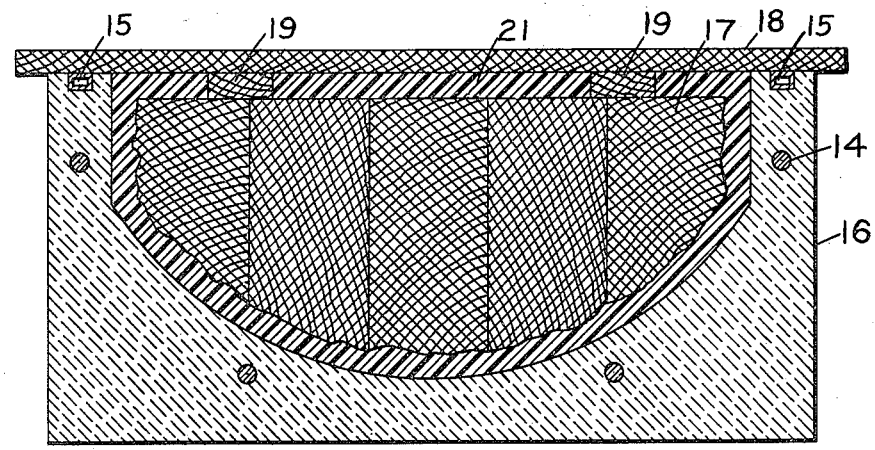
Figure 8 is a cross-sectional view taken on substantially the line 8—8 of Figure 7.
Figure 10:
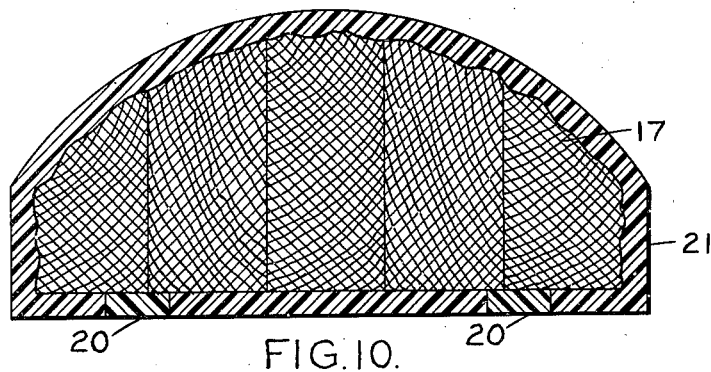
Figure 10 is a cross-sectional view taken on substantially the line 10—10 of Figure 9.
Figure 9:
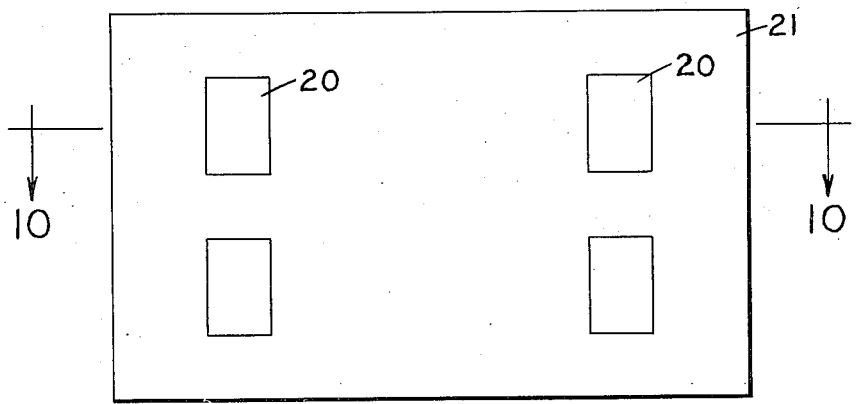
Figure 9 is a bottom view of a completed model duplicate.

A core 17 is made up. This core can be very rough and is made from carefully dried wood. The dimensions of the core are preferably one-half to five-eighths inch smaller in all dimensions than the interior of the mold. The core is suspended in the mold, as shown in Figures 7 and 8, by means of cross bars 18. These bars are long enough to extend from side to side of the mold and rest thereon. Between the cross bars 18 and the core, spacers 19 are placed. These may be rectangular wooden blocks which are screwed or otherwise secured to the core and to the cross bars. As will be seen in Figure 8, a space is left between the core 17 and the walls of the mold 16.

Fluid plastic is then poured into the mold so as to completely fill the spaces between the core and the mold and to cover the top of the core toward the open side of the mold. The plastic used is a suitable thermo-setting phenolic resin which will withstand temperatures of at least 150 degrees. Preferably the plastic is mixed with ground cork and asbestos, which act as a filler. After the plastic has been poured into the mold, the mold and casting are placed in an oven and baked at a temperature of approximately 150 degrees. The time of baking may vary considerably, depending upon the size of the casting. The minimum baking time is about 10 hours. The baking of the casting cures and hardens the same.

The casting and form are removed from the oven and the cross bars 18 and spacers 19 are removed from the casting. It will be evident that when the spacers 19 are taken from the casting, cavities 20 will remain in the casting at the points where the spacers were originally placed. These cavities are filled up with plastic, the plastic is carefully levelled off, and the casting again placed in the oven and baked until the plastic is hardened.

After the second baking of the casting, the complete casting, which is designated by the numeral 21, is removed from the form and is ready for use as a duplicate or replica of the wooden model. It may be desirable to mount the model duplicate on a frame, although in some instances, such as the one shown, this is not necessary.

By using the wood core, shrinkage of the finished casting is reduced to a minimum. When the thermo-setting plastics are cured there is always a slight shrinkage, but when the thickness of the plastic is but a fraction of an inch, as in the present case, the total shrinkage is so slight as to be negligible. However, if extreme accuracy in the finished model duplicate is desired, that accuracy can be achieved by scraping or chipping away a very small amount of the entire surface of the finished casting, after which the casting is again suspended in the mold, as previously described, and a very thin coating of plastic poured into the mold and over the casting. The casting is then baked as previously described.

From the foregoing it will be seen that the present invention provides a very simple and economical method of making accurate reproductions of an original wood model. The reproduction is extremely sturdy because of the use of the wood core which acts as a reinforcement for the reproduction. At the same time the wooden core reduces shrinkage of the casting during curing thereof to the minimum.

The scope of the invention is indicated in the appended claims.

1. The method of making a replica of a portion of a three dimensional object which comprises providing a model of said portion, forming a mold from said model using the latter as a pattern, providing a rigid substantially shrink free core smaller in all dimensions than said mold, suspending said core in said mold in spaced relation to the walls thereof, thereafter pouring fluid non-metallic thermo-setting plastic into said mold to cover said core and fill the spaces between the core and the walls of the mold, hardening said plastic to form a solid casting, and subsequently removing said casting from the mold.

2. The method of making a replica of a portion of a three dimensional object which comprises providing a model of said portion, forming a mold from said model using said model as a pattern, thereafter casting fluid non-metallic thermo-setting plastic into said mold, hardening said plastic to form a solid casting, subsequently removing said casting from the mold, removing a thin layer of plastic from those surfaces of the casting which touched the mold, replacing said casting in the mold in spaced relation to the sides of the latter, pouring fluid non-metallic plastic into the space between said casting and the walls of the mold, hardening said plastic, and subsequently removing the casting from the mold.

3. The method of making a replica of a portion of a three dimensional object which comprises providing a model of said portion, forming a mold from said model using the latter as a pattern, providing a rigid substantially shrink free core smaller in all dimensions than said mold, suspending said core in said mold in spaced relation to the walls thereof by means of spacing blocks, pouring fluid non-metallic thermo-setting plastic into said mold to fill the spaces between the core, the spacing blocks and the walls of the mold, hardening said plastic to form a solid casting, subsequently removing said casting from the mold, thereafter removing the spacing blocks from the casting, replacing the casting in the mold, filling the spaces formed by the removal of said spacing blocks with fluid plastic, hardening said plastic, and finally removing the casting from the mold.

4. The method of making a replica of a portion of a three dimensional object for use in the fabrication of sheet metal articles which comprises providing a model of said portion, forming a mold from said model using the latter as a pattern, providing a rigid core smaller in all dimensions than said mold, suspending said core in said mold in spaced relation to the walls thereof, thereafter pouring fluid non-metallic thermo-setting plastic into said mold to cover said core and fill the spaces between the core and the walls of the mold, baking said plastic to form a solid casting, and subsequently removing said casting from the mold.

5. The method of making a replica of a portion of a three dimensional object for use in the fabrication of sheet metal articles which comprises providing a model of said portion, forming a mold from said model using the latter as a pattern, providing a rigid substantially shrink free core smaller in all dimensions than said mold, suspending said core in said mold in spaced relation to the walls thereof by means of spacing blocks, pouring fluid non-metallic thermo-setting plastic into said mold to fill the spaces between the core and the walls of the mold, the spacing blocks and the walls of the mold, baking said plastic to form a solid casting, subsequently removing said casting from the mold, thereafter removing the spacing blocks from the casting, replacing the casting in the mold, filling the spaces formed by the removal of said spacing blocks with fluid non-metallic thermo-setting plastic, baking said last mentioned plastic, and finally removing the casting from the mold.

HAROLD E. RENAUD.

REFERENCES CITED

The following references are of record in the file of this patent:

UNITED STATES PATENTS

| Number | Name | Date |
|---|---|---|
| 791,648 | Richards | June 6, 1905 |
| 2,202,683 | Baesgen et al. | May 28, 1940 |
| 2,361,348 | Dickson et al. | Oct. 24, 1944 |
| 2,376,085 | Radford et al. | May 15, 1945 |
| 2,392,578 | Chenicek | Jan. 8, 1946 |
| 2,392,804 | Basolo | Jan. 15, 1946 |
| 2,428,697 | Champer | Oct. 7, 1947 |